(12) United States Patent
Syed et al.

(10) Patent No.: US 12,184,544 B1
(45) Date of Patent: Dec. 31, 2024

(54) DATA COMPRESSION FOR LPM IN TCAM (71) Applicant: DreamBig Semiconductor Inc., San Jose, CA (US)

(72) Inventors: Sohail A Syed, San Jose, CA (US); Hillel Gazit, Palo Alto, CA (US); Hon Luu, San Jose, CA (US); Pranab Ghosh, Pleasonton, CA (US)

(73) Assignee: Dreambig Semiconductor Inc., San Jose, CA (US)

( * ) Notice: Subject to any disclaimer, the term of this patent is extended or adjusted under 35 U.S.C. 154(b) by 0 days.

(21) Appl. No.: 17/710,629

(22) Filed: Mar. 31, 2022

Related U.S. Application Data (60) Provisional application No. 63/168,921, filed on Mar. 31, 2021.

(51) Int. Cl.
*H04L 45/745* (2022.01)
*G11C 8/08* (2006.01)
*G11C 15/04* (2006.01)
*H04L 9/40* (2022.01)
*H04L 45/42* (2022.01)
*H04L 45/586* (2022.01)

(52) U.S. Cl.
CPC .............. *H04L 45/586* (2013.01); *G11C 8/08* (2013.01); *G11C 15/04* (2013.01); *H04L 45/42* (2013.01); *H04L 45/745* (2013.01); *H04L 63/0435* (2013.01)

(58) Field of Classification Search
CPC ... H04L 63/0435; H04L 45/745; H04L 45/42; H04L 45/586; G11C 15/04; G11C 8/08
USPC ....................................................... 709/207
See application file for complete search history.

(56) References Cited

U.S. PATENT DOCUMENTS

| | | |
|---|---|---|
| 7,643,353 B1 | 1/2010 | Srinivasan et al. |
| 8,195,873 B2 | 6/2012 | Gazit |
| 9,094,307 B1 | 7/2015 | Edsall et al. |
| 9,262,312 B1 | 2/2016 | Gazit et al. |

(Continued)

FOREIGN PATENT DOCUMENTS

| | | | |
|---|---|---|---|
| WO | WO-98/07160 A2 | 2/1998 | |
| WO | WO-2007038805 A1 * | 4/2007 | ............. G11C 15/00 |

OTHER PUBLICATIONS

Resource-Efficient SRAM-Based Ternary Content Addressable Memory Ali Ahmed; Kyungbae Park; Sanghyeon Baeg IEEE Transactions on Very Large Scale Integration (VLSI) Systems Year: 2017 | vol. 25, Issue: 4 | Journal Article | Publisher: IEEE (Year: 2017).*

(Continued)

*Primary Examiner* — Joshua Joo
(74) *Attorney, Agent, or Firm* — MLO, a professional corp.

(57) ABSTRACT a content addressable memory circuit is provided that includes a memory array that includes multiple memory devices that include memory locations that share a memory address and are coupled for simultaneous access. Hash logic is operative to use modulo math to determine a memory address based upon non-X values within an IP address key. Memory controller logic is operative to cause a memory device in the memory array to store the received IP address key in a memory location at the determined memory address, in a format that includes a field-size value indicative of a number of non-X values within a received IP address key and that includes non-X values within the received IP address key.

26 Claims, 6 Drawing Sheets

(56) References Cited

U.S. PATENT DOCUMENTS

| | | | |
|---|---|---|---|
| 9,306,851 | B1 | 4/2016 | Gazit et al. |
| 9,424,366 | B1 | 8/2016 | Gazit et al. |
| 9,639,501 | B1 | 5/2017 | Gazit et al. |
| 10,254,968 | B1 | 4/2019 | Gazit et al. |
| 10,318,587 | B1 | 6/2019 | Bosshart et al. |
| 10,778,721 | B1 | 9/2020 | Holbrook et al. |
| 10,887,233 | B2 | 1/2021 | Labonte et al. |
| 11,683,039 | B1 | 6/2023 | Syed et al. |
| 11,720,492 | B1 | 8/2023 | Syed et al. |
| 11,886,746 | B1 | 1/2024 | Syed et al. |
| 11,899,985 | B1 | 2/2024 | Syed et al. |
| 11,922,032 | B1 | 3/2024 | Syed et al. |
| 2008/0112412 | A1* | 5/2008 | Pong ............... H04L 45/74591 370/392 |
| 2009/0190404 | A1 | 7/2009 | Roohparvar |
| 2010/0269018 | A1* | 10/2010 | Clark ................. G06F 11/1629 714/763 |
| 2012/0198107 | A1 | 8/2012 | Mckean et al. |
| 2013/0242632 | A1* | 9/2013 | Wada ..................... G11C 15/046 365/49.17 |
| 2014/0153310 | A1* | 6/2014 | Sekar ................... G11C 15/046 365/49.17 |
| 2015/0006808 | A1 | 1/2015 | Miller et al. |
| 2015/0121034 | A1 | 4/2015 | Steele, Jr. et al. |
| 2015/0169467 | A1* | 6/2015 | Chase ................ G06F 16/9014 711/216 |
| 2017/0040059 | A1 | 2/2017 | Arsovski et al. |
| 2017/0062051 | A1* | 3/2017 | Watanabe .............. G11C 15/04 |
| 2017/0242618 | A1 | 8/2017 | Tran et al. |
| 2018/0039662 | A1 | 2/2018 | Asai et al. |
| 2019/0259452 | A1* | 8/2019 | Asnaashari ......... G11C 11/1675 |
| 2023/0016020 | A1 | 1/2023 | Kim et al. |
| 2023/0251782 | A1 | 8/2023 | Chang et al. |

OTHER PUBLICATIONS

Resource-Efficient SRAM-Based Ternary Content Addressable Memory Ali Ahmed; Kyungbae Park; Sanghyeon Baeg IEEE Transactions on Very Large Scale Integration (VLSI) Systems Year: 2017 | vol. 25, Issue: 4 | Journal Article | Publisher: IEEE (Year: 2017) (Year: 2017).*

"U.S. Appl. No. 17/710,891, Ex Parte Quayle Action mailed Nov. 25, 2022", 7 pgs.

Demetriades, Socrates, et al., "An Efficient Hardware-basedMulti-hash Scheme for High Speed IP Lookup", Department of Computer Science University of Pittsburg, (Jun. 2008), 8 pages.

Meiners, Chad R., et al., "Algorithmic Approaches to Redesigning TCAM Based Systems", *Sigmetrics*, '08, Jun. 2-6, 2008, Annapolis, Maryland (Jun. 2008), 2 pgs.

Pagiamtzis, Kostas, et al., "Content-Addressable Memory (CAM) Circuits and Architectures: A Tutorial and Survey", *IEEE Journal of Solid-State Circuits*, 41(3) (Mar. 2006), 16 pages.

Ravikumar, V. C., et al., "TCAM Architecture for IP Lookup Using Prefix Properties", Published by the IEEE Computer Society 0272-1732/04, (Mar.-Apr. 2004), 61-69.

Sheu, Jang-Ping, et al., "Efficient TCAM Rules Distribution Algorithms in Software-Defined Networking", *IEEE Transactions on Network Service Management*, 15(2), (Jun. 2018), 12 pages.

Song, Yibo, et al., "A Low-power Content-Addressable Memory (CAM) Using Pipelined Search Scheme", *ICWET '10: Proceedings of the International Conference and Workshop on Emerging Trends in Technology*, (Dec. 2009), 6 pages.

Trinh, Nguyen, et al., "Algorithmic TCAM on FPGA with data collision approach", *Indonesian Journal of Electrical Engineering and Computer Science*, (Apr. 2021), 89-96.

"U.S. Appl. No. 17/710,572, Non Final Office Action mailed Jul. 18, 2023", 13 pgs.

"U.S. Appl. No. 17/710,572, Examiner Interview Summary mailed Aug. 23, 2023", 2 pgs.

"U.S. Appl. No. 17/710,572, Response filed Sep. 6, 2023 to Non Final Office Action mailed Jul. 18, 2023", 20 pgs.

"U.S. Appl. No. 17/710,798, Ex Parte Quayle Action mailed Sep. 8, 2023", 8 pgs.

"U.S. Appl. No. 17/710,678, Corrected Notice of Allowability mailed Mar. 30, 2023", 4 pgs.

"U.S. Appl. No. 17/710,678, Corrected Notice of Allowability mailed Apr. 10, 2023", 4 pgs.

"U.S. Appl. No. 17/710,678, Corrected Notice of Allowability mailed Jun. 26, 2023", 2 pgs.

"U.S. Appl. No. 17/710,678, Notice of Allowance mailed Mar. 16, 2023", 19 pgs.

"U.S. Appl. No. 17/710,891, Corrected Notice of Allowability mailed May 17, 2023", 2 pgs.

"U.S. Appl. No. 17/710,891, Notice of Allowance mailed Feb. 8, 2023", 8 pgs.

"U.S. Appl. No. 17/710,891, Response filed Jan. 18, 2023 to Ex Parte Quayle Action mailed Nov. 25, 2022", 5 pgs.

Bremier-Barr, Anat, et al., "Encoding Short Ranges in TCAM Without Expansion: Efficient Algorithm and Applications", SPAA '16, Jul. 11-13, 2016, Pacific Grove, CA, (2016), 35-46.

Liu, Huan, "Efficient Mapping of Range Classifier into Ternary-CAM", Proceedings 10th Symposium on High Performance Interconnects (HOTI '02), (2002), 6 pgs.

Meiners, Chad R., et al., "Bit Weaving: A Non-Prefix Approach to Compressing Packet Classifiers in TCAMs", IEEE/ACM Transactions on Networking, vol. 20, No. 2, (Apr. 2011), 488-500.

Ullah, Inayat, et al., "EE-TCAM: An Energy-Efficient SRAM-Based TCAM on FPGA", Electronics, 7(9), 186, (2018), 15 pgs.

Ullah, Zahid, et al., "E-TCAM: An Efficient SRAM-Based Architecture for TCAM", Circuits, Systems, and Signal Processing, 33, (2014), 3123-3144.

Vegesna, S. M. Srinivasavarma, et al., "A Novel Rule Mapping on TCAM for Power Efficient Packet Classification", ACM Transactions on Design Automation of Electronic Systems, vol. 24, .No. 5, Article 48, (Jun. 2019), 23 pgs.

Zhang, Chaoqin, et al., "RETCAM: An Efficient TCAM Compression Model for Flow Table of OpenFlow", Journal of Communications and Networks, vol. 22, No. 6, (Dec. 2020), 484-491.

"U.S. Appl. No. 17/710,798, Corrected Notice of Allowability mailed Jan. 17, 2024", 2 pgs.

"U.S. Appl. No. 17/710,798, Response filed Sep. 19, 2023 to Ex Parte Quayle Action mailed Sep. 8, 2023", 8 pages.

"U.S. Appl. No. 17/710,572, Notice of Allowance mailed Sep. 25, 2023", 9 pages.

"U.S. Appl. No. 17/710,840, Notice of Allowance mailed Oct. 4, 2023", 8 pages.

"U.S. Appl. No. 17/710,572, Notice of Allowability mailed Oct. 5, 2023", 5 pages.

"U.S. Appl. No. 17/710,840, Corrected Notice of Allowability mailed Oct. 13, 2023", 2 pages.

"U.S. Appl. No. 17/710,798, Notice of Allowance mailed Oct. 26, 2023", 8 pages.

* cited by examiner

Fig. 1

| KEY | RULE |
|---|---|

DATA COMPRESSION FOR LPM IN TCAM

CROSS-REFERENCE TO RELATED APPLICATION

This application claims priority to U.S. provisional application Ser. No. 63/168,921, filed Mar. 31, 2021, entitled, ALGORITHMIC TERNARY CONTENT ADDRESSABLE MEMORY, which is incorporated herein in its entirety by this reference.

BACKGROUND

Content addressable memory (CAM) is a special type of memory that determines memory storage locations to associate with input data based upon the input data. A typical memory, such as a random access memory (RAM), is accessed based upon memory addresses. In contrast a CAM is accessed based upon content stored at one or more memory addresses. During a read operation of a typical memory, the memory receives an address value as an input and, in response, outputs a data value stored at a memory location corresponding to the received address value. A CAM operates in a different manner. During a read operation of a CAM, the CAM receives as input, content data that may be stored at some location in the CAM, and outputs an indication of whether that data value is present at a CAM address location. The content data received as input to a CAM during a read operation is commonly referred to as a search expression or as a key. During a typical CAM read operation, a CAM searches for stored entries in the CAM that match the key. A typical CAM can compare in parallel each of a plurality of content data values stored within the CAM with a key to determine whether there exists a stored content data value that matches the key and if so, output an indication of the match. Thus, a CAM accesses content (i.e., stored data values) by comparing content stored within the CAM with a key.

Applications of CAM include routing Internet packets, cache memory for microprocessors, and artificial intelligence to name just a few examples. Many network devices (e.g., bridges, switches, routers, gateways, network proxies), for example, use a ternary CAM for routing operations. A ternary CAM (TCAM) is referred to as ternary because it can store data in any of three different states: logic 0, logic 1 and X. Data having an "X" or "don't care" state is of no relevance to a content search being conducted.

TCAMs often are used in routers to store routing tables for Internet Protocol (IP) addresses. IP addresses typically comprise two sections, a network section that identifies a network or subnet mask and a host section that identifies specific machine or host within the network. The network section of a destination IP address is commonly referred to as an IP prefix. A routing table at a router associates IP address network sections of an IP address received over a network at the router with a next destination router on a network. A longest prefix match (LPM) algorithm often is used to match IP prefixes of IP addresses within information packets received at a router to IP prefixes stored in a routing table, to identify next destination routers to which to send the packets over the network. Since routes to different network destinations can use overlapping networks, IP prefixes of a destination IP addresses often match more than one IP prefix within a routing table. The LPM algorithm determines the longest prefix match to select a next destination router. A typical LPM algorithm the compares the IP prefix of a received IP address, bit-by-bit, with IP prefix entries stored in the routing table. The IP prefix entry that has the longest number of network bits that match the received IP prefix is selected and a packet containing the destination IP address is sent over the network to a corresponding router indicated in the table.

One form of LPM algorithm uses a trie search technique, which involves traversal of a digital tree or prefix tree, to locate an IP prefix having a longest perfect match within a routing table. However, trie search techniques have disadvantages. A trie search can involve long delay times resulting in slower and less efficient processes. Traversing down the tree for 144 bits, for example, can be a long process. Moreover, the delay is non-deterministic since a longest pathway can vary in length, which can result significant variation in delay times. Moreover, memory resources dedicated to a trie search generally cannot be used for alternative purposes. Thus, there is a need for improvement to determining LPMs for a destination IP addresses.

SUMMARY

In one aspect, a content addressable memory circuit is provided that includes a memory array that includes multiple memory devices that include memory locations that share a memory address and are coupled for simultaneous access. Hash logic is operative to use modulo math to determine a memory address based upon non-X values within an IP address key. Memory controller logic is operative to cause a memory device in the memory array to store the received IP address key in a memory location at the determined memory address, in a format that includes a field-size value indicative of a number of non-X values within a received IP address key and that includes non-X values within the received IP address key.

In another aspect, a method is provided to store an IP address key in a memory array that includes multiple memory devices that include memory locations that share a common address and are coupled for simultaneous access. Modulo math is used to determine a memory address within the memory array based upon non-X values within the IP address key. The IP address key is stored in a memory location at the determined memory address, in a format that includes a field-size value indicative of a number of non-X values within the received IP address key and that includes the non-X values within the received IP address key.

In another aspect, a content addressable memory circuit is provided that includes a memory array that includes multiple respective memory devices that include memory locations that share a common address and are coupled for simultaneous access. Hash logic is operative to use modulo math to determine a shared common memory address within the memory array based upon non-X values within a received IP address key. A plurality of memory locations within memory devices of the memory array store IP address keys in a format that includes a field-size value and non-X IP address key values. Multiple selector logic circuits are operatively coupled to receive a field-size value output from corresponding memory devices. Multiple comparator circuits are operatively coupled to a receive non-X address key values output from corresponding memory devices. Memory control logic operative is during a read operation in response to the received IP address key, to cause multiple respective memory devices to output stored field-size values and non-X IP address key values from memory locations at the determined shared common memory address. Each selector logic circuit is operative in response to the read operation to determine a number of non-X value comparisons that a corresponding comparator circuit is to make based upon a field size value output from a corresponding memory device. Each comparator circuit is operative in response to the read operation to compare the determined respective number of non-X values in the received IP address key with non-X values output from a corresponding memory device and to provide a respective comparison result.

In another aspect, a method is provided to control a content addressable memory circuit that includes a memory array that includes multiple respective memory devices that include memory locations that share a common address and are coupled for simultaneous access. Modulo math tis used to determine a shared common memory address within the memory array based upon non-X values within a received IP address key. IP address keys are stored at a plurality of memory locations within memory devices of the memory array in a format that includes a field-size value and non-X IP address key values. Stored field-size values and non-X IP address key values are output from memory locations in the memory array at the determined shared common memory address. For each memory address location that outputs a stored field-size value and non-X IP address key values, a respective number of non-X IP address key values of the received IP address key to compare is determined based upon the outputted field size value. For each memory address location that outputs a stored field-size value and non-X IP address key values, the determined respective number of non-X IP address key values of the received IP address key are compared with the outputted non-X IP address key value, and a comparison result is provided.

BRIEF DESCRIPTION OF DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Overview:

A modulo math-based hash function is used to determine memory addresses at which to store a plurality of IP address keys. Each of the IP address keys is stored in a memory device at a memory address determined for the IP address key using the modulo math-based function. Each of the IP address keys is stored in a format that includes the non-X values within the IP address key and that includes field-size information indicative of the number of stored non-X values in the IP address key.

During a read operation, an IP address key value is received. The modulo math-based hash function is used to determine a memory address to access for a read based upon the received IP address key. Content data is output by the memory device from the determined read address. Field-size information within the outputted content data is used to determine a field size of high order values of the received IP address key to compare with non-X bits stored at the determined read address. A comparator simultaneously compares, in parallel, a field-size range of the high order bit values of the received IP address key with the non-X bits of a stored IP address key.

Thus, of a field-size range IP address bits are evaluated simultaneously, in parallel, for a longest prefix match, which obviates the need for traversal of a digital tree or prefix tree.

Figure 1:
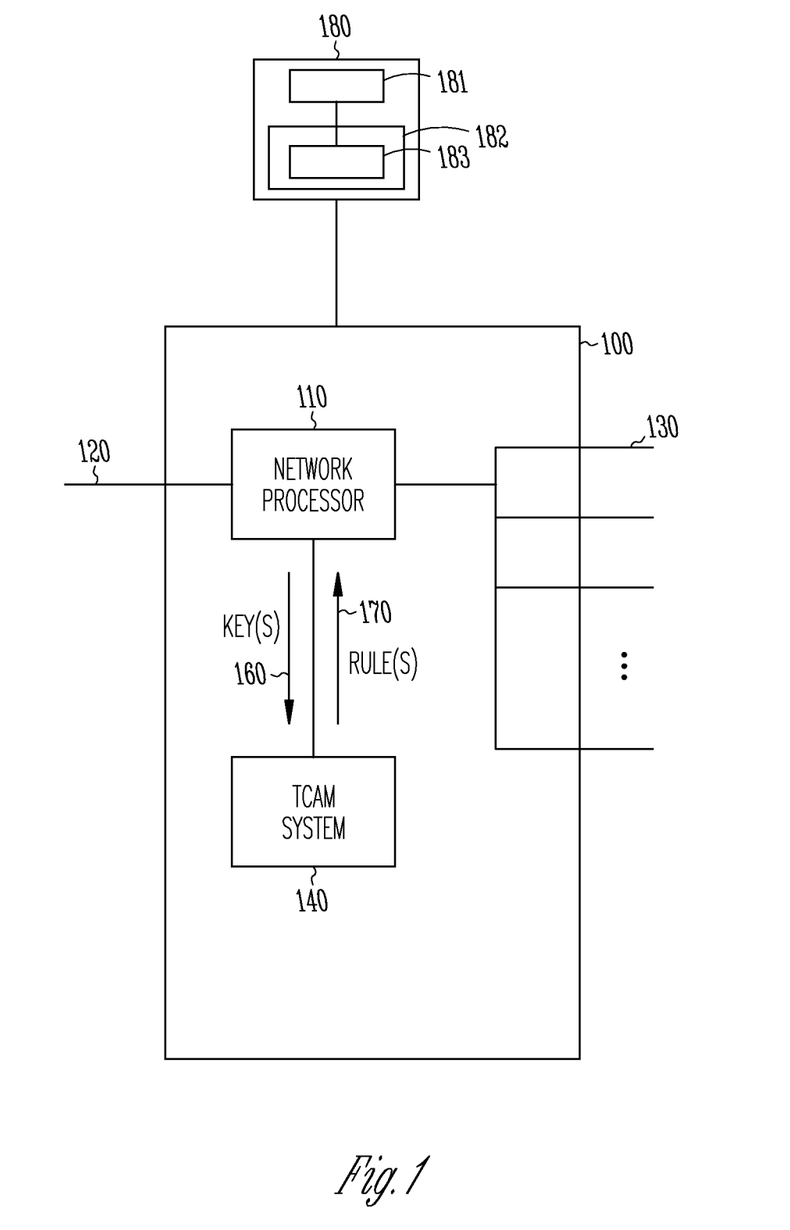
FIG. 1 is an illustrative drawing showing an example network device in accordance with some embodiments.

Network Device:

FIG. 1 is an illustrative drawing showing an example network device 100. The network device 100 can include one or more integrated circuit (IC) devices, a larger device, such as a router or switch, or a combination of these. In some implementations, the network device 100 is coupled with a computing machine 180 within a network communications apparatus. The computing machine 180 can include multiple processor circuits 181 coupled to non-transitory memory 182 that includes instructions 183 to configure the computing machine 180 to perform operations described herein. In some implementations, the network device 100 is a network communications apparatus and includes the computing machine 180. The network device 100 can be coupled with a computer network, such as a local area network (LAN) or a wide area network (WAN), and processes data packets that comprise ordered sequences of binary data values.

The network device 100 includes a network processor device 110, which receives the packets or portions of packets on an input port or interface 120. The network processor 110 parses incoming packet information to identify relevant data fields that provide information for handling network operations, such as routing and forwarding. The network processor 110 can be coupled with a TCAM-based network rules search engine 140, hereinafter referred to as the "TCAM system" 140, which assists in determining appropriate actions to take in response to receipt of packets over a network. The network processor 110 extracts information from the packets, referred to as key information 160. The key information is used to identify rules that determine appropriate actions to take in response to the received packets. The key information represents data bits within a packet that indicate packet information such as network addresses or portions thereof, port numbers, other header and trailer information, or combinations thereof, for example. The network processor 110 can generate key information, also referred as "keys", that use ternary value bits, which can have any of three states, logic 0, logic 1, or X ("don't care"), to represent the binary bits extracted from a packet. In general, ternary value bits within a key that represent a logic value 0 or a logic value 1 contribute to identifying a rule that determines an action to take based upon a packet represented by the key, and ternary value bits within a key that represent an X state do not contribute to identifying a rule that determines an action take based upon the packet represented by the key.

Figure 2:
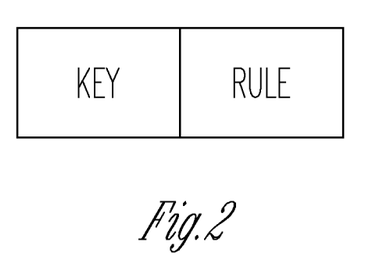
FIG. 2 is an illustrative drawing representing an example content data record that includes a key and an associated rule searched based upon the key.

The network processor 110 sends ternary key information 160 to the TCAM system 140, which stores rules associated with such key information that indicate corresponding action to take. In response to receipt of key information 160 corresponding to a packet, the TCAM system 140 returns one or more corresponding rules 170 identified using the key information 160. The network processor 110 determines actions to take based on the returned one or more rules 170. Such actions can include outputting a packet on a selected output port or interface 130 or dropping a packet, as appropriate, for example. The TCAM system 140 includes one or more memory devices to store keys in association with corresponding rules 170. Matches between previously stored keys and keys provided by the network processor 110, in response to received packets, are searched to identify rules to use to route or switch the received packets. FIG. 2 is an illustrative drawing representing an example content data record, stored in a memory device, that includes a key and an associated rule searched based upon the key.

Figure 3:
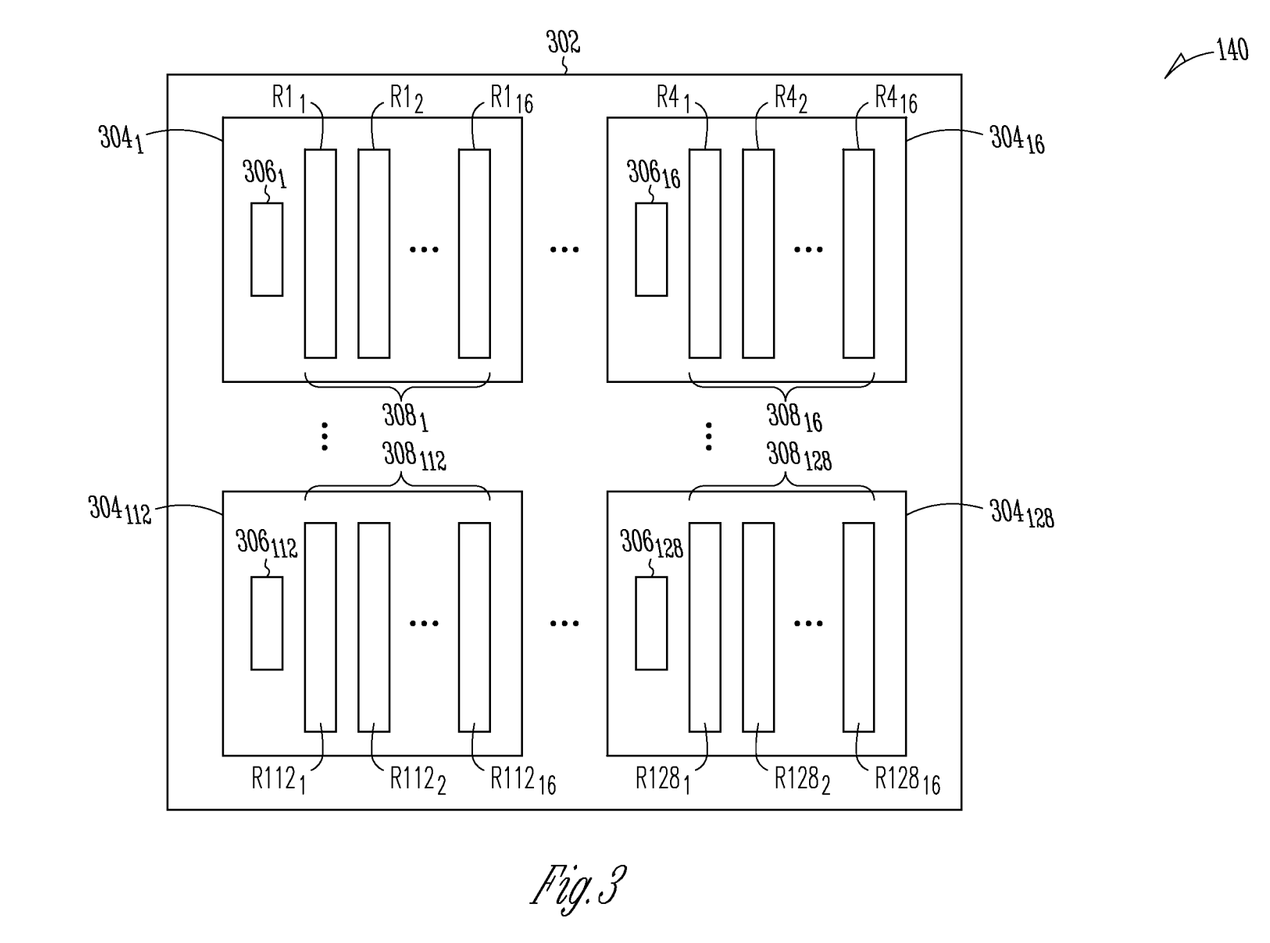
FIG. 3 is an illustrative drawing representing an example integrated circuit that includes multiple TCAM modules.

TCAM System:

FIG. 3 is an illustrative drawing representing an example integrated circuit TCAM system 140 that includes multiple TCAM memory modules $304_1$-$304_{128}$. Each TCAM memory module $304_1$-$304_{128}$ includes a corresponding hash RAM $306_1$-$306_{128}$ and a corresponding data RAM array $308_1$-$308_{128}$. Each data RAM array includes multiple data RAMs. More specifically, each data RAM array includes 16 data RAMs. For example, a first data RAM array $304_1$ includes data RAMs $R1_1$-$R1_{16}$. A 128 data RAM array $306_{128}$ includes data RAMs $R128_1$-$R128_{16}$. The TCAM system 140 is shown with 128 TCAM memory modules and 16 data RAMs per TCAM memory module. However, an example integrated circuit TCAM system 140 can include a smaller number of TCAM memory modules such as 64 TCAM memory modules or a larger number of TCAM memory modules such as 256 TCAM modules and can include a different number of data RAMs per TCAM module, for example.

Figure 4:
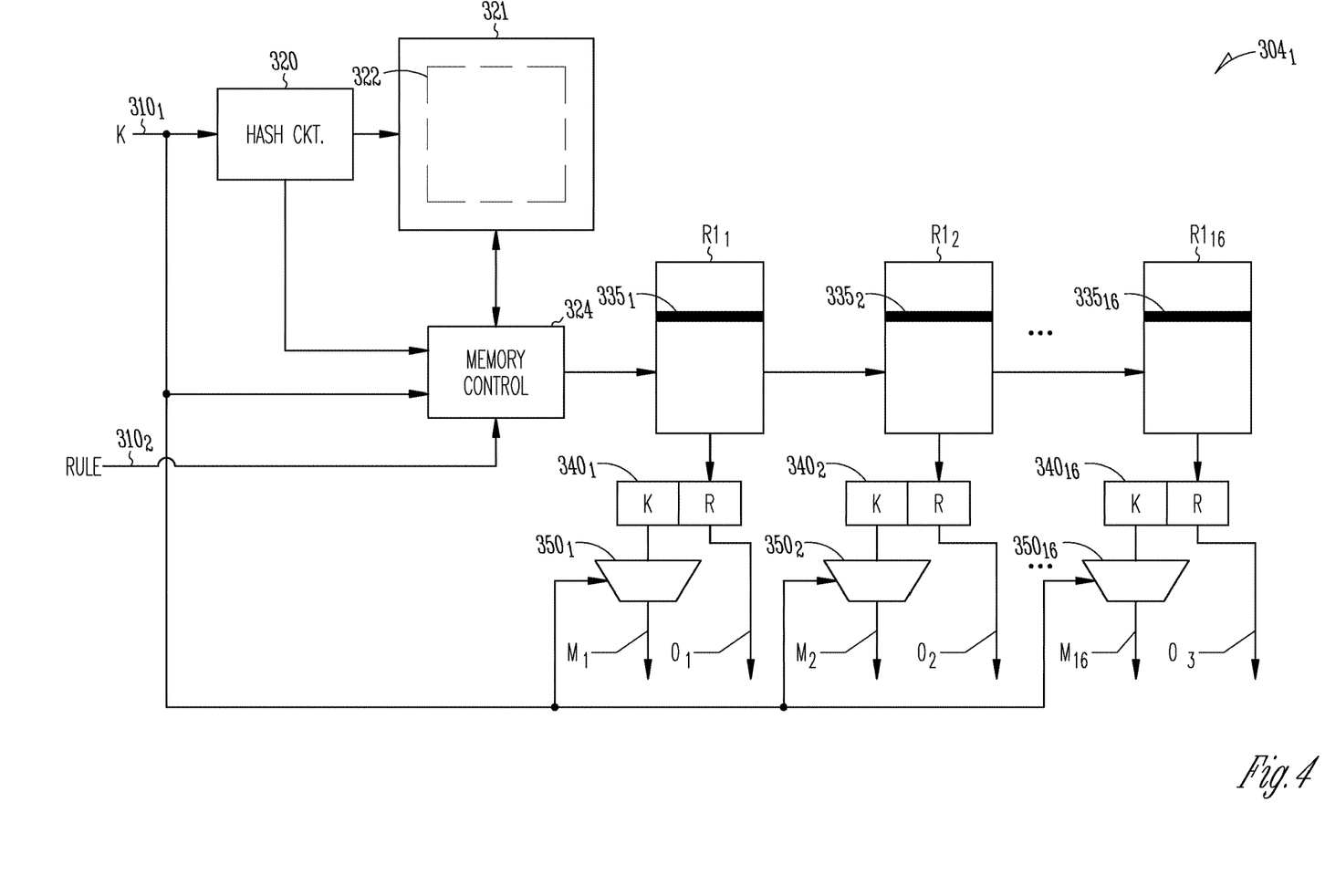
FIG. 4 is an illustrative drawing showing an example TCAM module in accordance with some embodiments.

FIG. 4 is an illustrative drawing showing certain details of an example first TCAM module $304_1$ implemented using algorithmic TCAM in accordance with some embodiments. The TCAM system $304_1$ includes an input interface $310_1$ on which a ternary key is received, an input interface $310_2$ on which a corresponding rule is received, hash logic circuitry 320, hash table storage device 321 that includes a dynamic hash table 322, multiple data RAM memory devices $R1_1$-$R1_{16}$, and memory control logic 324. The hash logic 320 produces hash values. In a dynamic hash configuration, the hash logic produces hash values to indicate locations within the hash table 322 of address pointers to indicate memory location segments within the memory device array $R1_1$-$R1_{16}$ where key values and corresponding rules are stored. In a modulo math-based configuration, the hash logic produces hash values that indicate memory location segments within the memory device array $R1_1$-$R1_{16}$ where key values and corresponding rules are stored. The memory control logic 324 controls access to memory location segments memory devices $R1_1$-$R1_{16}$ based upon address pointers within the hash table 322.

The memory device array $R1_1$-$R1_{16}$ can include integrated circuit RAM memory devices of various types, such Static RAM (SRAM), Dynamic RAM (DRAM), Synchronous DRAM (SDRAM), Flash RAM, etc. For example, each memory device $R1_1$-$R1_{16}$ can be a 512×256 RAM. In addition, each of memory devices $R1_1$-$R1_{16}$ can have an associated output buffer circuits $340_1$-$340_{16}$ and comparator circuits $350_1$-$350_{16}$.

Each memory address of the example first memory module $304_1$ corresponds to sixteen memory location segments, e.g., wordlines, one within each of the memory devices $R1_1$-$R1_{16}$. During each read or write, each of the sixteen memory devices $R1_1$-$R1_{16}$ is simultaneously accessed using a common shared memory address.

The example TCAM module $304_1$ includes sixteen memory devices $R1_1$-$R1_{16}$. However, the number of memory devices employed in a TCAM module $304_1$ (e.g., one, two, four, eight, sixteen, etc.) can vary with implementation. The hash logic 320 can be implemented in hardware or software. For instance, an example TCAM module $304_1$ can use the computing machine 180 to implement the hash logic 320. The hash logic 320 is operable during a data write operations to determine hash values, based upon received keys, that can be used as address pointers stored in the hash table 322 that indicate memory address locations of memory segments within the multiple memory devices $R1_1$-$R1_{16}$ in which to store the received keys. The hash logic 320 is operable during data read operations to determine hash values based upon received keys, to match with address pointers stored in the hash table 322, that to indicate memory segment locations within memory devices $R1_1$-$R1_{16}$ from which to read previously stored keys and associated rules.

Hash Logic:

The hash logic 320 uses a logical or mathematical hash function to determine hash values based upon one or more ternary bits within key values received at the interface $310_1$. The memory control logic 324 uses the hash vales to determine memory address location segments to access memory addresses in the memory devices $R1_1$-$R1_{16}$ during reads and writes. The hash logic 320 receives a key as input at interface $310_1$ and based upon the received key, generates a value referred to as a hash value or hash that can be used to assign a received key to a common memory segment, e.g., a common wordline, that is present within each of the memory devices $R1_1$-$R1_{16}$.

As explained below, example hash logic 320 is provided that can be configured produce hash values for ordinary keys and that can be configured to produce hash values for IP address keys. In an example TCAM system 140, adder logic can be used to implement the modulo math-based hash function. Alternatively, one or more computing machines 180 can be configured with instructions 183 to implement a dynamic hash logic operation or a modulo math-based hash function.

Ordinary (Non-IP Address) Keys:

As used here, the term "ordinary key" refers to a key value that can have an X value at any bit position. Unlike IP address keys, there is no restriction of X values to the lowest order bit positions. It will be understood that the ordinary keys may correspond to a wide variety of specialized network protocols or other kinds of information and that the term "ordinary" is used as a term of convenience to indicate keys that do not correspond to IP addresses.

Dynamic Hash Logic Operation for Ordinary Keys:

During a write of an ordinary key value (K), the key value is received at first input interface lines $310_1$ and rule information (R) can be received at second input interface lines $310_2$. Example hash logic 320 generates a hash value in response to the key value received at the key input $310_1$, which indicates a memory address location within the hash table 322 that includes an address pointer to a segment within the memory array $308_1$ in which to store the key value. The received key may include one or more X values that are not restricted to lower order bit positions. Example hash logic can select non-X values from the received key for use in determining a hash value. An example memory segment can include corresponding wordlines $335_0$-$335_{15}$ present within respective memory devices $R1_1$-$R1_{16}$. The memory control logic 324 determines a memory device from among memory devices $R1_1$-$R1_{16}$ in which to store the key and a corresponding rule. For example, the memory control logic may determine to store the key and associated rule at wordline $335_1$ in memory device $R1_1$. A key and a corresponding rule may be referred to collectively herein as a "content data".

During a read of an ordinary key value, the key value is received at the key interface $310_1$. The hash logic 320 produces a hash value in response to the received key value. The received key may include one or more X values that are not restricted to lower order bit positions. Example hash logic can select non-X values from the received key for use in determining a hash value. The hash value indicates a location in the hash table 322 that stores a pointer to a common memory location segment present within each of the memory devices $R_1$-$R_{16}$, such as a respective wordlines $335_1$-$335_{16}$, in which to search for a match for the received key value. The memory control logic 324 causes a read access of content data, at the identified common memory segment location, from the multiple memory devices $R1_1$-$R1_{16}$. Output buffer circuits $340_1$-$340_{16}$ receive content data output from the memory devices. The content data includes keys and corresponding rule information previously written to the memory devices. The comparators $350_1$-$350_{16}$ compare stored key values received at corresponding buffers $340_0$-$340_{15}$ with the key received at the key interface $310_1$ and provide indications of whether there is a match. A comparator $350_1$-$350_{16}$ that detects a match sends a match signal on a corresponding match line $M_1$-$M_{16}$, which causes a corresponding output buffer to provide a rule on an output line $O_1$-$O_{16}$ for return to the network processor 110.

IP Address Keys:

Keys that represent destination IP addresses are referred to herein as "IP address keys". IP address keys can represent destination IP addresses with different levels of specificity. The longer the IP address network section specified in an IP address key, the greater the specificity of the destination IP address indicated by the IP address key. A received IP address key includes ternary values in which logic 1 and logic 0 values are used to specify the IP address network section included in an IP address prefix and can include X values to specify a portion of the IP address network section that is not specified. X values are used only in lower order bit positions in an IP address key and no logic 1 or logic 0 bit is located at a bit position lower than an X value in an IP address key.

For instance, 00000001.00000001.00000001.00000001 is a first example IPv4 address, which has 32 bits. The first example IPv4 IP address has four 8-bit sections. A first example IPv4 IP address key 00000001. 00000001. 00000001.XXXXXXXX has a 24-bit prefix that represents the first example IPv4 address with 24 bits of specificity. A second example IPv4 address key 00000001.00000001. XXXXXXXX.XXXXXXXX has a 16-bit prefix that represents the first example address key with 16 bits of specificity. Thus, the first example IPv4 IP address key represents the first example IPv4 address with greater specificity than the second IPv4 IP address key.

Modulo Math-Based Hash Logic Operation for IP Address Keys:

The hash logic 320 can be configured to use modulo mathematics (Number % Modulus) to determine memory address locations within the RAM module $308_1$ at which to store IP address keys. IP address keys represent destination IP addresses.

Figure 5:
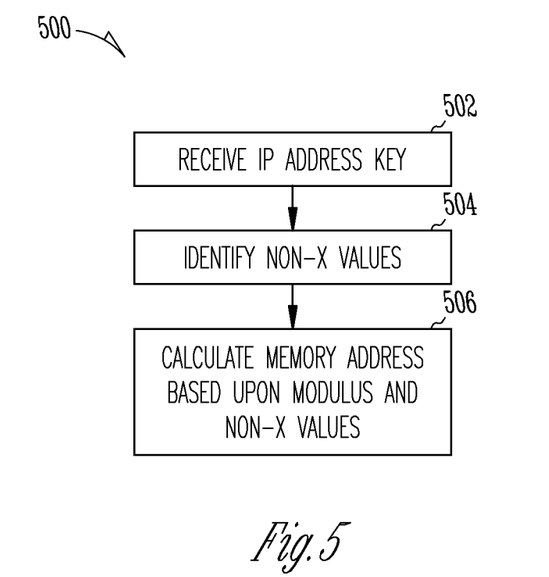
FIG. 5 is an illustrative flow diagram representing a modulo math-based hash process to determine memory addresses for IP address keys.

FIG. 5 is an illustrative flow diagram representing a modulo math-based hash process 500 to determine address locations within the memory array $308_1$ for IP address keys. The hash logic 320 can be implemented to use modulo math (Number % Modulus) to determine memory address locations within the RAM module $308_1$ at which to store IP address keys. The hash logic 320 can be implemented using the computing machine 180 configured instructions 183 to perform the hash process 500. Operation 502 receives an IP address key. Operation 504 identifies non-X values within the received IP address key. Operation 506 determines a memory address segment within the memory array $308_1$ based upon a modulus and the identified non-x values.

An example modulus is selected based upon number of memory address segments within the memory array $308_1$. An example modulus value of 1024 is selected based upon a memory array $308_1$ that includes 1024 memory segments, e.g., wordlines, identified as address locations 0 to 1023. Referring to the first example IPv4 address key, operation 504 determines the non-X values to be 00000001.000000001.00000001, which represent the decimal number 66,304. Operation 506 computes a memory address to correspond to the first example Ipv4 address using modulus mathematics (66,304%1024) to be 768. Thus, an Ipv4 address key containing the IP address prefix 00000001.00000001.00000001 is stored in the memory array $308_1$ at memory address 768. Referring to the second example Ipv4 address key, operation 504 determines the non-X values to be 00000001.00000001, which represent the decimal number 513. Operation 506 computes a memory address to correspond to the second example Ipv4 address using modulus mathematics (513%1024) to be 513. Thus, an Ipv4 address key containing the IP address prefix 00000001.00000001 is stored in the memory array $308_1$ at memory address 513.

It is noted that the hash table 322 is not used to store address location pointers to IP address locations that store IP address keys.

IP Address Key Storage Formats:

Three different address formats can be used to arrange IP address key values within address segments of the memory array $308_1$. An example short address format represents a 32-bit IPv4 address. An example long address format represents a 128-bit IPv6 address. An example medium address format representation represents a 64-bit IPv6 address. The example devices $R_1$-$R_{16}$ of the memory array $308_1$ can store up to 128 bits per line. Thus, a memory segment that includes wordlines $335_1$ to $335_{16}$ can store up to 128 bits at wordline $335_1$ in a first memory device $R_1$, can store up to 128 bits at a wordline $335_2$ of the second memory device $R_2$, can store up to 128 bits at wordline $335_3$ of the third memory device $R_3$, etc. It will be appreciated that memory devices with different wordline widths, such as 256 bits per wordline, can be used consistent with the principles disclosed herein.

The example short address format includes priority information, which can indicate a rule or an address pointer to other information corresponding to an IP address key. The number of priority bits can be a fixed number, such as 8 bits, which is not included in the number of X bits. The short address format is used to arrange an IPv4 address keys for storage in the example sixteen memory devices $R_1$-$R_{16}$ of the example memory array $308_1$ is as follows.

<#number_of non_X bits1><non_X bits1><priority1><#number_of non_X bits2><non_X bits2><priority2> . . . <#number_of non_X bits16><non_X bits16><priority16>

An example non_X_bit length field, <#number_of_non_X bits1>, indicates the number of non_X_bits in the IP address key stored in memory device $R_1$, referred to herein as "field-size". An example non-X bits field, <non_X_bits1>, sets forth the nonX_bits in the IP address key stored in device $R_1$. An example priority field, <priority1>, sets forth priority bits for the IP address stored in device $R_1$. It will be appreciated that, alternatively, field-size can indicate the number of X bits from which the number of non_X bits can be readily derived.

The field-size for the short address format can be represented using five bits. A short address format for a 32-bit IPv4 address key can fit within a 128 wordline of a storage device of the example memory array $308_1$.

A short address representation of the first example IPv4 address is: <24><00000001000000100000001><10101010>, assuming example priority information 10101010. The short address representation of the first example IPv4 has field-size 24.

A short address representation of the second example IPv4 address is: <16><0000000100000001><10101010>, assuming an example priority information 10101010. The short address representation of the second example IPv4 has field-size 16.

The medium address format is used to arrange for a 64-bit IPv6 address key for storage in the example sixteen memory devices $R_1$-$R_{16}$ of the example memory array $308_1$ is as follows.

<#number_of_non_X_bits1><non_X_bits1><priority1>
<#number_of_non_X_bits2><non_X_bits2><priority2> . . . <#number_of_non_X_bits16><non_X_bits16><priority16>

The field-size for the medium address format can be represented using six bits. An entire medium address format can fit within a 128 wordline of a storage device of the example memory array $308_1$.

The long address format is used to arrange an IPv4 address key for storage in the example sixteen memory devices $R_1$-$R_{16}$ of the example memory array $308_1$ is as follows.

<#number_of_non_X_bits1><non_X_bits1><priority1>
<#number_of_non_X_bits2><non_X_bits2><priority2> . . . <#number_of_non_X_bits16><non_X_bits16><priority16>

The field-size for the long address format can be represented using seven bits. A long address format for a 128-bit IPv6 address key can fit within a 128 wordline of a storage device of the example memory array $308_1$. However, an IPv6 address key often is associated virtual routing function (VRF) value, typically 16 bits for example, that also must be stored. It is noted that the storage device 321 used to store the dynamic hash table 322 is available to store the VRF values since the modulo math-based hash function does not utilize the dynamic hash table 322 for storage of address pointers. The TCAM system 140 takes advantage of the availability of the hash table 322 to store VRF values corresponding to a 128-bit IPv6 address keys at memory addresses within the hash table 322 that correspond to the memory addresses in the memory array $308_1$ where the IPv6 address keys are stored. In general, all IP address keys in each memory address segment share the same VRF, and therefore, a single VRF can be stored in the hash table 322 for an entire memory segment, e.g., for each of wordlines $335_1$-$335_{16}$.

Accessing IP Address Keys:

During a write of an IP address key value, the key value is received at first input interface lines $310_1$ and rule information (R) can be received at second input interface lines $310_2$. Example hash logic 320 determines a memory address at which to write the received IP address key value according to the process 500 described above with reference to FIG. 5. An example hash value includes an address to a common memory segment that is present within each of memory devices $R1_1$-$R1_{15}$. An example common memory segment can include corresponding wordlines $335_1$-$335_{16}$ present within respective memory devices $R1_1$-$R1_{16}$. The memory control logic 324 determines a memory device from among memory devices $R1_1$-$R1_{16}$ in which to store the key and a corresponding rule at a determined common memory address. The rule may comprise priority information. The received IP address key and corresponding a rule (e.g., priority information) are stored in a format based upon IP address key length. An IP address key that is 32 bits or shorter, such as a 32-bit IPv4 address key, is stored in the short format. An IP address key that is between 33 and 64 bits, such as a 64-bit IPv6 address, is stored in medium format. An IP address key that is 65 bits or longer, such as a 128-bit long IPv6 address key, is stored in the long format. The memory control logic 324 may determine to store the key and associated rule at wordline $335_1$ in memory device $R1_1$, for example. An IP address key and a corresponding rule (e.g., priority) may be referred to collectively herein as a "content data".

Figure 6:
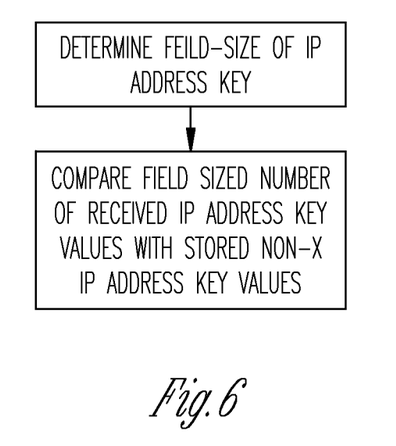
FIG. 6 is an illustrative flow diagram representing a comparison process to compare IP address keys stored at different memory devices within a common address segment of a memory array.

During a read of an IP address key value, the key value is received at the key interface $310_1$. The hash logic 320 computes hash value that determines a memory address from which to read in response to the received IP address key value, according to the process 500 described above with reference to FIG. 5. The hash value includes the determined memory address for a segment that is present within each of memory devices $R1_1$-$R1_{15}$. The memory control logic 324 causes a read access of content data, at the determined common memory address, from the multiple memory devices $R1_1$-$R1_{16}$. Output buffer circuits $340_1$-$340_{16}$ receive content data output from the memory devices. The comparators $350_1$-$350_{16}$ compare stored IP key address values received at corresponding buffers $340_0$-$340_{15}$ with the IP key value received at the key interface $310_1$ and provide indications of whether there is a match. A comparator $350_1$-$350_{16}$ that detects a match sends a match signal on a corresponding match line $M_1$-$M_{16}$, which causes a corresponding output buffer to provide a rule on an output line $O_1$-$O_{16}$ for return to the network processor 110. FIG. 6 is an illustrative flow diagram representing a comparison process 600 to compare IP address keys stored at different memory devices within a common address segment of a memory array. The computing machine 180 can be configured with instructions 183 to implement the comparison process 600. For each respective memory device $R_1$-$R_{16}$, operation 602 accesses a respective non_X_bit length field included in content data output to the respective buffer $240_1$-$240_{16}$ during a read access, to determine the field-sizes of respective IP address keys stored at the determined memory address location in each of the respective memory devices $R_1$-$R_{16}$. For each memory device $R_1$-$R_{16}$, operation 604 causes a corresponding respective comparator $250_1$-$250_{16}$, to compare a respective non X field-size number of high order bits of the received IP address key with the non-X bits stored in the respective memory device.

For instance, consider the above examples involving an example IP address key 00000001.00000001. 00000001. XXXXXXXX. Assume for example that the example IP address key was previously written, with priority, to memory location 768 in the first storage device $R_1$, arranged in the short address format, <24><0000000100000000-100000001><10101010>. Further, assume for example, that IP address key 00000000.11111000.00000001, which represent the decimal number 63,489, is received at input interface $310_1$ in concert with a read access request. Further, assume that the hash logic 320 determines a modulo math-based address of 768 for the received IP address key. The memory control logic 324 causes the first memory device $R_1$ to output the stored content data<24><0000000100000001000000001><10101010> to the first buffer $240_1$. Operation 602 determines a field-size 24, based upon the value 24 within the non_X bit length field, <#number_of_non_X bits1>. Operation 604 causes the first comparator $250_1$ to simultaneously, in parallel, compare the 24 high order bits of the received IP address key, 000000001111100000000001, with corresponding ones of the 24 non_X_bits of the stored IP address key, 000000010000000100000001. In this example, the first comparator $250_1$ determines no match at address location 768 of the first memory device $R_1$, based upon the comparison. Similar comparison determinations are made simultaneously, in parallel, for content data stored at memory address 768 in each of memory devices $R_2$-$R_{16}$.

Figure 7:
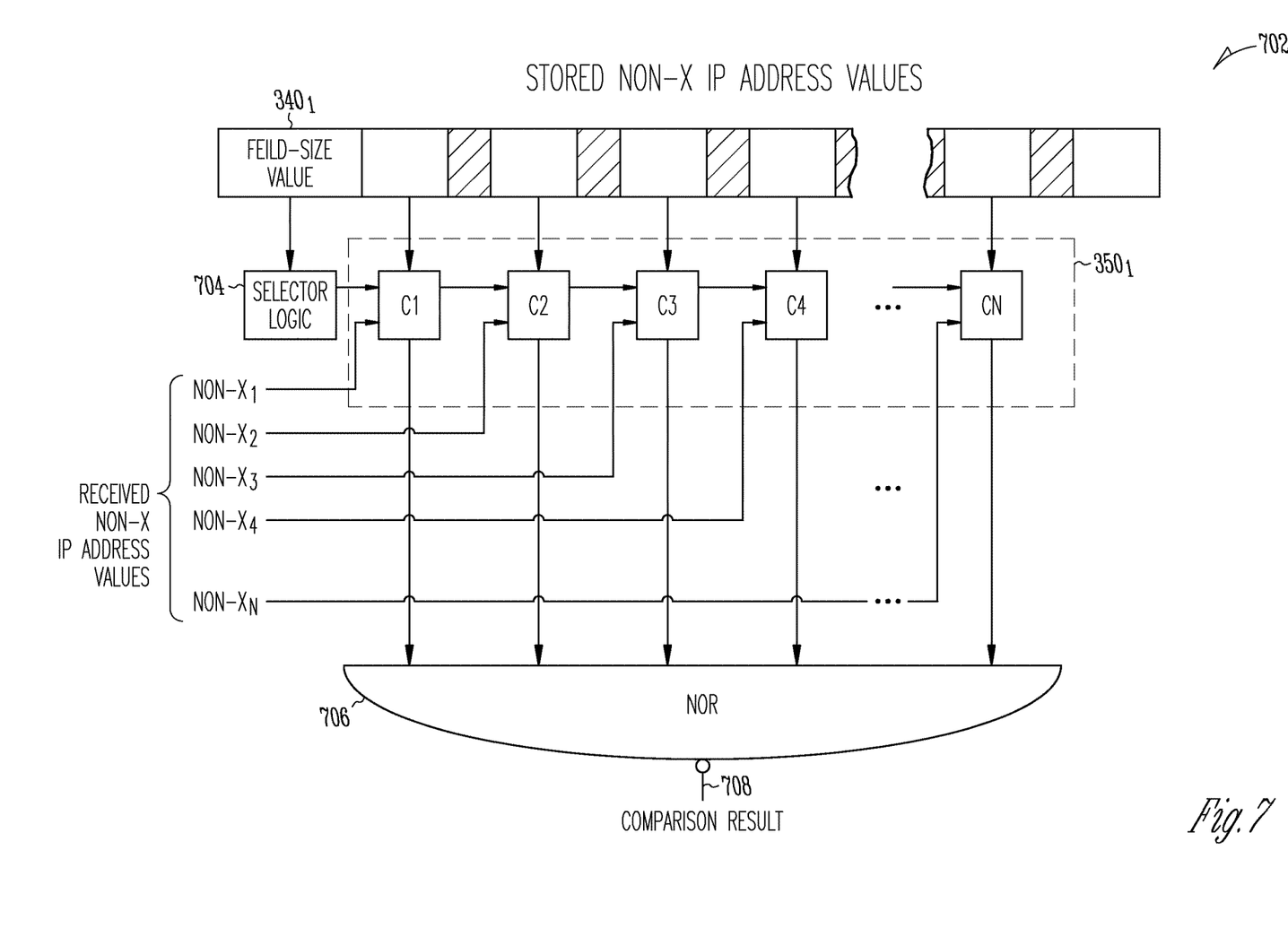
FIG. 7 is an illustrative schematic block diagram representing an example comparator system.

FIG. 7 is an illustrative schematic block diagram representing an example comparator system 702. The example comparator system 702 includes the buffer $340_1$ and comparator $350_1$ (indicated with dashed lines) which are coupled to memory device $R_1$ as shown in FIG. 4. To simplify the drawing and the description, memory device $R_1$ is not shown. The comparator system 702 includes selector logic 704. During a read operation in response to a received IP address key, the memory device $R_1$ outputs to the buffer circuit $340_1$, an IP address key that was previously stored in a compressed format that includes a field-size value and non-X values of the IP address key, but none of the X-values of the IP address key. The selector logic 704 accesses the field-size value from the buffer circuit $340_1$. Based upon the field-size value, the selector logic 704 determines the number of non-X value bits outputted to the buffer $340_1$. The comparator $350_1$ comprises multiple component comparators C1, C2, C3, etc. The component comparators of an example comparator $350_1$ each compares two-bits. The selector logic sends 704 control signals to activate a number of comparators required to compare each of the outputted non-X IP address value with a corresponding non-X value of the received IP address value. Thus, the selector logic 704 determines a longest possible prefix match that can be made using the outputted non-X values in the buffer $340_1$ and configures the comparator $350_1$ to perform that longest possible match. Thus, there is no need, as in a trie function, to conduct a bit-wise tree search algorithm to determine the length of a match. Rather, the stored field-size value provides that length information directly, so that the non-X IP values of the received IP address key can be compared in parallel with corresponding non-X values of the stored IP address key. The component comparators provide comparison results to a logic gate 706 that provides a comparison result 708 that indicating a match if all non-X values of a received IP address key match non-X IP address values to which they are compared.

The above description is presented to enable any person skilled in the art to make and use modulo math-based hash to determine longest prefix matches of IP addresses. Various modifications to the examples will be readily apparent to those skilled in the art, and the generic principles defined herein may be applied to other embodiments and applications without departing from the spirit and scope of the invention. In the preceding description, numerous details are set forth for the purpose of explanation. However, one of ordinary skill in the art will realize that the invention might be practiced without the use of these specific details. In other instances, well-known processes are shown in block diagram form in order not to obscure the description of the invention with unnecessary detail. Identical reference numerals may be used to represent different views of the same or similar item in different drawings. Thus, the foregoing description and drawings of embodiments in accordance with the present invention are merely illustrative of the principles of the invention. Therefore, it will be understood that various modifications can be made to the embodiments by those skilled in the art without departing from the spirit and scope of the invention, which is defined in the appended claims.

The invention claimed is:

1. A content addressable memory circuit comprising:
    an interface to receive an IP address key;
    a random access memory device that includes a plurality of worldlines, each wordline operable to store multiple data bits and each wordline having a corresponding wordline address;
    hash logic operative to use modulo math to determine a wordline address within the memory device, based upon non-X values within a received IP address key; and
    memory controller logic to cause the memory device to store within the memory device at a wordline that corresponds to the determined wordline address, the non-X values within the received IP address key and a field-size value that indicates how many non-X values are within the received IP address key.

2. The content addressable memory circuit of claim 1, wherein the memory controller logic is operable to cause the memory device to store a priority value at the wordline that corresponds to the determined wordline address.

3. The content addressable memory circuit of claim 1 further including
    a storage device operable for use as a dynamic hash table;
    wherein the memory controller logic is operable to cause the storage device to store a virtual routing function value that corresponds to the received IP address key.

4. The content addressable memory circuit of claim 1, wherein the hash logic is operative to use modulo math to determine a wordline address within the memory device, based upon the non-X values within a received IP address key and a modulus based upon a number of memory locations within the memory array.

5. A method to store an IP address key in a memory array that includes multiple memory devices that include memory locations that share a common address and are coupled for simultaneous access, the method comprising:
    using modulo math to determine a memory address within the memory array based upon non-X values within the IP address key and a modulus based upon a number of memory locations within the memory array; and
    storing non-X values of the IP address key in a memory location at the determined memory address, in a format that includes a field-size value indicative of a number of non-X values within the IP address key.

6. The method of claim 5, wherein the format includes no X-values of the IP address key.

7. The method of claim 5 further including:
storing a priority value in the memory location with the IP address key at the determined memory address.

8. The method of claim 5 further including:
storing a virtual routing function value that corresponds to the IP address key in a storage device that is operable for use as a dynamic hash table.

9. The method of claim 5, wherein using modulo math includes using modulo math to determine a memory address within the memory array based upon non-X values within the IP address key and a modulus based upon a number of memory locations within the memory array.

10. A content addressable memory circuit comprising:
an interface to receive an IP address key;
a memory array that includes multiple respective memory devices that include memory locations that share a common address and are coupled for simultaneous access;
hash logic operative to use modulo math to determine a shared common memory address within the memory array based upon non-X values within a received IP address key;
wherein a plurality of memory locations within memory devices of the memory array each stores non-X values of a different IP address key in a format that includes a field-size value indicative of how many non-X IP values are stored at the memory location;
multiple respective selector logic circuits, each operatively coupled to receive a field-size value output from a corresponding memory device;
multiple respective comparator circuits, each operatively coupled to a receive non-X address key values output from a corresponding memory device; and
memory control logic operative during a read operation in response to the received IP address key, to cause multiple respective memory devices to output stored field-size values and non-X IP address key values from memory locations at the determined shared common memory address;
wherein each selector logic circuit is operative in response to the read operation to determine a respective number of non-X value comparisons that a corresponding comparator circuit is to make based upon a respective field size value output from a corresponding memory device; and
wherein each comparator circuit is operative in response to the read operation to compare the determined respective number of non-X values in the received IP address key with non-X values output from a corresponding memory device and to provide a respective comparison result.

11. The content addressable memory circuit of claim 10, wherein the format includes no X-values.

12. The content addressable memory circuit of claim 10, wherein the memory locations that share a memory address include wordlines that that share a wordline address.

13. The content addressable memory circuit of claim 10, wherein the plurality of memory locations within memory devices of the memory array store priority with the field-size values and non-X IP address key values.

14. The content addressable memory circuit of claim 10, wherein the memory control logic is operative during a read operation in response to the received IP address key, to cause multiple respective memory devices to simultaneously output stored field-size values and non-X IP address key values from memory locations at the determined shared common memory address.

15. The content addressable memory circuit of claim 10, wherein each comparator circuit is operative during the read operation to compare the determined respective number of non-X values in the received IP address key with a corresponding number of non-X values output from a corresponding memory device in parallel and to provide a respective comparison result.

16. The content addressable memory circuit of claim 10, wherein the hash logic is operative to use modulo math to determine a shared common memory address within the memory array based upon non-X values within a received IP address key and a modulus based upon a number of memory locations within the memory array.

17. A method to control a content addressable memory circuit that includes a memory array that includes multiple respective memory devices that include memory locations that share a common address and are coupled for simultaneous access, the method comprising:
receiving an IP address key;
using modulo math to determine a shared common memory address within the memory array based upon non-X values within a received IP address key and a modulus based upon a number of memory locations within the memory array;
storing non-X values of different IP address keys at different memory locations in a format that includes at each different memory location a field-size value indicative of how many non-X values are stored at the different memory location;
outputting stored field-size values and non-X IP address key values from memory locations in the memory array at the determined shared common memory address;
for each memory address location that outputs a stored field-size value and non-X IP address key values, determining a respective number of non-X IP address key values of the received IP address key to compare based upon the outputted field size value; and
for each memory address location that outputs a stored field-size value and non-X IP address key values, comparing the determined respective number of non-X IP address key values of the received IP address key with the outputted non-X IP address key value, and providing respective a comparison result.

18. The method of 17, wherein outputting includes simultaneously outputting stored field-size values and non-X IP address key values from memory locations in the memory array at the determined shared common memory address.

19. The method of 17, wherein comparing includes comparing, in parallel, the determined respective number of non-X IP address key values of the received IP address key with the outputted non-X IP address key value and providing a comparison result.

20. The method of claim 17, wherein using modulo math includes using modulo math to determine a shared common memory address within the memory array based upon non-X values within a received IP address key and a modulus based upon a number of memory locations within the memory array.

21. A content addressable memory circuit comprising:
an interface to receive IP address keys for use with a write operation or for use with a read operation;
multiple random access memory devices that each includes a plurality of worldlines, each wordline of each random access memory device operable to store multiple data bits, wherein each wordline of each random access memory device corresponds to at least one wordline of each of the other random access memory devices, and wherein corresponding wordlines of different random access devices have shared wordline addresses and are coupled to permit simultaneous access;
hash logic operative to use modulo math to determine shared wordline addresses within the random access memory devices, based upon non-X values within the received IP address keys;
memory controller logic;
wherein the memory controller logic is operative during a write operation to cause a random access memory device, from among the multiple random access memory devices, to store at a wordline having a shared address determined for an IP address key received for use with the write operation, non-X values of the IP address key received for use with the write operation and a corresponding field-size value that indicates how many non-X values are within the IP address key received for use with the write operation; and
wherein the memory controller logic is operative during a read operation to cause each respective random access memory device, that stores respective non-X values of a respective IP address key previously received for use with the write operation and that stores a corresponding respective field size value at a respective wordline of the respective random access memory device having a shared memory address determined for an IP address key received for use with the read operation, to output the stored respective non-X values and the stored corresponding respective field size value from the respective wordline of the respective random access memory device having the shared memory address determined for the IP address key received at the interface for use with the read operation.

22. The content addressable memory circuit of claim 21, wherein the hash logic operative to use modulo math to determine shared wordline addresses within the random access memory devices, based upon non-X values within the received IP address keys and a modulus based upon a number of memory locations within the memory array.

23. The content addressable memory circuit of claim 21, further including:
multiple respective selector logic circuits, each operatively coupled to receive a field-size value output from a corresponding random access memory device during an occurrence of the read operation of the memory controller logic; and
multiple respective comparator circuits, each operatively coupled to a receive non-X address key values output from a corresponding random access memory device during the occurrence of the read operation of the memory controller logic;
wherein each selector logic circuit is operative in response to the occurrence of the read operation to determine a respective number of non-X value comparisons that a corresponding comparator circuit is to make based upon a respective field size value output from a corresponding random access memory device; and
wherein each comparator circuit is operative in response to the occurrence of the read operation to compare the determined respective number of non-X values, in the IP address key received for use with the occurrence of the read operation, with non-X values output from a corresponding random access memory device and to provide a respective comparison result.

24. A method to access an IP address key in a memory array that includes multiple memory devices that each includes a plurality of memory locations, wherein each memory location has a memory address, and wherein corresponding memory locations of different memory devices have shared memory addresses and are coupled to permit simultaneous access, the method comprising:
receiving one or more IP address keys at an interface for use with a write operation or with a read operation;
using modulo math to determine shared memory addresses within the memory array, based upon non-X values within the IP address keys;
during a write operation of the memory array, storing non-x values of an IP address key received for use with the write operation in a memory device, from among the multiple memory devices, at a memory location having a shared memory address determined for the IP address key received for use in the write operation, in a format that includes a corresponding field-size value indicative of a number of non-X values within the IP address key received for use in the write operation; and
during a read operation of the memory array, causing memory devices from the memory array, that store non-X values of IP address keys previously received for use with the write operation and corresponding field size values at memory locations having a shared memory address determined for an IP address key received at the interface for use with the read operation, to output the stored non-X values of IP address keys and the stored corresponding field size values from memory locations having the shared memory address determined for the IP address key received at the interface for use with the read operation.

25. The method of claim 24,
wherein using modulo math includes using modulo math to determine shared memory addresses within the memory array, based upon non-X values within the IP address keys and a modulus based upon a number of memory locations within the memory array.

26. The method of claim 24, further including:
for each respective memory address location that outputs non-X IP address key values and a stored corresponding field-size value, determining a respective number of non-X IP address key values of the IP address key received for use with the read operation to compare based upon the outputted field size value; and
for each respective memory address location that outputs respective non-X IP address key values and a respective stored corresponding field-size value, comparing the determined respective number of non-X IP address key values of the IP address key received for use with the read operation with the outputted respective non-X IP address key value, and providing respective a comparison result.

* * * * *